United States Patent
Fujino et al.

(12) 
(10) Patent No.: US 6,593,855 B2
(45) Date of Patent: Jul. 15, 2003

(54) SHOCK MEASUREMENT APPARATUS AND SHOCK MEASUREMENT METHOD

(75) Inventors: Takane Fujino, Kanagawa-ken (JP); Kazutaka Okasaka, Kanagawa-ken (JP); Keishi Takahashi, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/891,952

(22) Filed: Jun. 26, 2001

(65) Prior Publication Data

US 2002/0043114 A1 Apr. 18, 2002

(30) Foreign Application Priority Data

Jun. 29, 2000 (JP) ........................................ 2000-197369

(51) Int. Cl.[7] .............................................. G08B 21/00
(52) U.S. Cl. .................... 340/683; 340/679; 360/75; 360/97.02
(58) Field of Search ................................ 340/635, 683, 340/679; 360/137, 900, 97.02, 69, 75, 60; 361/685

(56) References Cited

U.S. PATENT DOCUMENTS 5,757,580 A * 5/1998 Andress et al. .......... 360/97.02
5,923,487 A * 7/1999 Carlson et al. ................ 360/60
6,031,317 A * 2/2000 Chen ............................ 310/329
6,108,163 A * 8/2000 Boutaghou .................. 360/137

FOREIGN PATENT DOCUMENTS

| JP | 2-179479 | 7/1990 |
|---|---|---|
| JP | 4-152268 | 5/1992 |
| JP | 5-133974 | 5/1993 |
| JP | 2000-97730 | 4/2000 |
| JP | 2000-97965 | 4/2000 |
| JP | 2000-99868 | 4/2000 |

* cited by examiner

Primary Examiner—Van Trieu
(74) Attorney, Agent, or Firm—Robert B. Martin; Bracewell & Patterson, L.L.P.

(57) ABSTRACT

The object of the present invention is to provide a shock measurement apparatus which allows shock received by a hard disk drive of a notebook PC to be precisely measured without altering the physical characteristics of the PC. A shock measurement apparatus for measuring shock received by a notebook PC having an media bay for installing a hard disk drive includes a shock measurement circuit with an acceleration pickup for detecting acceleration as shock and a hard disk drive-compatible power supply connector for receiving electrical power from an internal power supply contained in the notebook PC. The shock measurement apparatus is sized to match the form factor of the hard drive disk.

14 Claims, 5 Drawing Sheets

SHOCK MEASUREMENT APPARATUS AND SHOCK MEASUREMENT METHOD

BACKGROUND OF THE INVENTION

1. Technical Field

The present invention relates to a shock measurement apparatus, and in particular to a shock measurement apparatus that can accurately detect and record shock received by a hard disk drive installed in a notebook personal computer (PC).

2. Description of the Related Art

Hard disk drives are the most popular data storage means for computers. A hard disk drive is composed of one or more magnetic disks arranged coaxially and driven by a spindle motor. Data is read/written by a magnetic head facing the magnetic disk and the magnetic disk is driven by an actuator, typically a voice coil motor. The magnetic disk, the magnetic head, and the actuator are enclosed in a housing called an enclosure case.

A hard disk drive is sensitive to shock because it includes dynamic mechanics, such as the spindle motor for rotating the magnetic disk and the actuator for the magnetic head. Moreover, a hard disk drive is often installed within a notebook PC that can experience shock events. For example, it can bump against obstacles while being carried or fall to the floor. Notebook PCs receive greater and more frequent shocks than desktop PCs. Accordingly, a hard disk drive installed in a notebook PC requires high shock-resistance.

Improving the shock-resistance of the hard disk drive requires that the shock that the hard disk receives be accurately measured. Several uses of such a measurement exist. For example, the shock received by a notebook PC during operation may be measured, and if the measured value exceeds a predetermined value, read/write operation of the hard disk drive can be suspended. Additionally, failure of the PC may be predicted based on measurements of the shock received by the notebook PC during operation.

In order to measure the shock accurately, the shock received by the hard disk drive must be measured while the hard disk drive is installed in the notebook PC. Unfortunately, attaching a shock measurement instrument to the hard disk drive or the notebook PC would change the size and center of mass of the system. These changes increase the difficulty of accurately measuring the shock received by a hard disk drive installed in a notebook PC.

Many instruments for measuring and recording shock received by equipment have been proposed, including those described in Published Unexamined Patent Application Nos. 2-179479, 4-152268, 5-133974, 2000-97730, 2000-97965, and 2000-99868.

For example, in Published Unexamined Patent Application No. 2-179479, a shock recording apparatus is disclosed which comprises means for detecting shock in X, Y, and Z directions, recording means for recording information about the shock, a battery for power supply, and a connector for providing the information recorded in the recording means to an external indicating or recording means, all contained in a small portable case.

In Published Unexamined Patent Application No. 5-133974, a hard disk drive is disclosed in which a sensor with piezoelectric polymer film is installed. Published Unexamined Patent Application No. 5-133974 discloses a shock apparatus which senses shock received by a hard disk drive and provides a write stop signal to the read/write head.

As mentioned above, many proposals have been made concerning apparatus for sensing and recording shock. However, they are inadequate for accurately measuring the shock received by a hard disk drive. That is, if the shock recording apparatus proposed in Published Unexamined Patent Application No. 2-179479 is attached to a notebook PC, the measured shock value would be inaccurate due to the altered weight and center of mass of the system.

In the process of developing a new note book PC, shock received by a hard disk drive attached to the PC may be measured, and the result of the measurement may be reflected in the design of the PC. The apparatus proposed in Published Unexamined Patent Application No. 5-133974 can measure shock without making substantial change to the physical characteristics of a notebook PC because it uses the shock sensor made of piezoelectric polymer film. However, that apparatus is designed to measure shock during operation. It provides a write stop signal to the read/write head after sensing shock received by the hard disk drive and does not accommodate measurement during development that can be reflected in the design of a new notebook PC.

It is therefore an object of the present invention to provide a shock measurement apparatus that can accurately measure shock received by equipment, such as a notebook PC, without altering the physical characteristics of the equipment. It is another object of the present invention to provide a shock measurement apparatus that allows the result of the shock measurement to be reflected in the design of new equipment.

SUMMARY OF THE INVENTION

The inventor conceived the idea of constructing a shock measurement apparatus with an enclosure similar to a hard disk drive in order to measure shock received by the hard disk drive of a notebook PC without altering the physical characteristics of the PC. The components, such as magnetic disks, of the hard disk drive are contained in a housing called an enclosure case and the size of the enclosure case is specified by a specification called a "form factor." In current notebook PCs, a hard disk drive having a 2.5-inch form factor is used, and a region called a "media bay" (or device bay), intended for receiving the hard disk drive is provided in the body of the notebook PC. The hard disk drive is attached to this bay. Therefore, if a shock measurement apparatus is fabricated, which has an enclosure of the same size as the form factor of the hard disk drive and the same weight, shock measured with this shock measurement apparatus attached to the media bay of the notebook PC would imitatively measure shock actually received by the hard disk.

The current 2.5-inch form factor of the hard disk installed in notebook PCs typically has dimensions of 100 mm (l), 70 mm (w), and 9.5 mm (t). A major problem with fabricating the shock measurement apparatus using an enclosure of this size is that the thickness is limited to 9.5 mm. Great difficulty arises in finding a power supply battery that supplies power sufficient to drive the shock measurement apparatus and fits within this thickness range. The notebook PC; however, contains a battery for driving the PC, and the power problem can be solved by arranging the shock measurement apparatus so as to receive electric power from that battery. A connector compatible with a power connector for the hard disk drive is provided in the shock measurement apparatus of the present invention to allow the shock measurement apparatus to be supplied with power by the battery of the notebook PC.

The present invention takes account of the abovementioned considerations and provides a shock measurement apparatus for measuring shock received by a hard disk drive device installed in a computer. The apparatus comprises: a sensor for detecting the shock, a power receiving connector for receiving power from the computer, and an enclosure containing the sensor and the power connector and having the same size as a disk drive device.

Because the enclosure case of the shock measurement apparatus according to the present invention has the same size as a disk drive device, the shock measurement apparatus can measure shock while attached to a region in the computer that is intended for installation of a disk drive device, the media bay of a notebook PC. This means that shock can be measured without altering the physical characteristics of the computer under measurement. Therefore, the shock that would actually be received by the disk drive unit can be precisely measured in an imitative manner. That the enclosure case of the shock measurement apparatus has the same size as a hard disk drive device does not require an exact physical match. In the case of a hard disk drive, it only requires that the shock measurement apparatus can be attached to the media bay as though it were a hard disk drive. The size specification merely requires that the device satisfy requirements regarding attachment position and the connection of the connector, and that the physical characteristics of the computer are not substantially changed. Furthermore, the "hard disk drive device" herein is not limited to a hard disk drive. For example, a compact disk (CD) drive and magnetooptical (MO) disk drive may also be attached, like the hard disk drive, to the media bay and are covered by the present invention.

The shock measurement apparatus according to the present invention is supplied with its electric power through the power connector. This arrangement does not require a power supply buttery, thus achieving a shock measurement apparatus that satisfies the requirements of the form factor size, particularly a thickness of 9.5 mm, of the 2.5-inch hard disk drive mounted on a current notebook PC. A shock measurement apparatus of a size equal to or smaller than the form factor size of a 2.5-inch hard disk drive can be achieved because it is supplied with power from the external power supply instead of containing an internal battery.

The shock measurement apparatus according to the present invention includes a sensor for detecting shock. The sensor may be a conventional sensor. For example, a piezoelectric material such as the piezoelectric polymer film described in Published Unexamined Patent Application No. 5-133974, mentioned above, may be used. Acceleration (G: acceleration of gravity) may be measured as the shock value.

One needs to consider where the sensor should be positioned. When the shock measurement apparatus attached to a computer is used for a shock test, directly measuring shock received by the computer would lead to a precise shock measurement. To achieve this, it is desirable that the shock measurement apparatus be placed in a high-stiffness position in the enclosure. The hard disk drive is typically bolted to the notebook PC. The bolted part of the hard disk drive, called a "foot", has high stiffness and directly receives the shock received by the notebook PC. Therefore, it is desirable that parts equivalent to the "foot" be provided on the enclosure of the shock measurement apparatus used for measurement of shock to a hard disk drive, and that the sensor is positioned near the foot.

Memory, which can store the results of measurement, is provided in the shock measurement apparatus of the present invention, and the results can be read from the memory. The read results of the measurement can then be reflected in the revisions to the design of a computer.

While the present invention has been described as a shock measurement apparatus, the invention may be applied to other equipment. The present invention provides a shock measurement apparatus for measuring shock received by a variety of equipment. It includes a detachable unit with a power supply connector for providing power to the apparatus. The shock measurement apparatus includes: a shock measurement circuit with a sensor portion for detecting shock, a power connector connected to the power supply connector of the equipment for receiving power for driving the shock measurement circuit. The shock measurement apparatus is attached to a region of the equipment where conventional equipment would be attached.

The shock measurement apparatus according to the present invention is used for shock measurement with the apparatus attached to the region where conventional equipment would be attached. Thus the measured shock value will precisely represent the shock that would be received by conventional equipment attached to the computer.

To attach the shock measurement apparatus to the region where conventional equipment would be attached, the size of the shock measurement apparatus should match the size of conventional equipment. This is because the physical characteristics of the equipment to which the shock measurement apparatus is attached should be the same as the physical characteristics of the equipment to which the conventional equipment is attached. The region to which the conventional equipment is attached is generally a void space. In addition, the apparatus includes fasteners such as bolts for attachment. Therefore, if the shock measurement apparatus is larger than the region, it cannot be attached to the equipment. On the other hand, if the shock measurement apparatus is smaller than the region, it can be placed in the region but cannot be properly attached to the equipment with the fasteners.

It is desirable that the sensors in the shock measurement apparatus of the present invention detect shock in each of X, Y, and Z directions. The shock measurement values in three directions thus obtained can be effectively used for the design of computers or hard drives in order to improve their shock resistance.

The shock measurement circuit in the shock measurement apparatus comprises a central processing unit (CPU) responsible for the operation of the shock measurement circuit, memory for storing measured shock values, and a charge amplifier mounted on a substrate. The shock measurement apparatus of the present invention comprises a minimum set of components required for measuring and recording the shock values. The shock measurement apparatus does not require connections, such as external wiring, when shock is applied to the equipment with the apparatus attached.

By providing, in the shock measurement circuit, an interface for sending/receiving data to and from external devices, data on recorded shock values can be transferred to data collection and analyzing devices such as PCs. The interface may include conventional interface means such as RS232C or USB connections.

The shock measurement apparatus of the present invention applies to a hard disk drive unit or other conventional equipment, which comprises dynamic mechanics, including driving means such as a motor and mechanical elements driven by the driving means, because such a dynamic mechanism is subject to breakage by shock. While a hard disk drive with a dynamic mechanism is a good example of a unit suitable for application of the shock measurement apparatus of the present invention, this does not limit the application of the present invention.

A typical application of the shock measurement apparatus of the present invention is a hard disk drive. Therefore, the shock measurement apparatus of the present invention is a shock measurement apparatus for imitatively measuring shock received by a mobile computer having a region for receiving a hard disk drive, wherein the shock measurement apparatus comprises: an enclosure having the same size as the form factor of a hard disk drive, a shock measurement circuit, which is placed in the enclosure and includes an acceleration sensor for detecting acceleration as shock, and a power receiving connector for receiving power from the internal power supply of the mobile computer. The shock measurement apparatus of the present invention is used for measurement during attachment to the region in which the hard disk drive is to be attached. Thus, although the measured results are imitative of the shock measurement of a computer with a hard disk drive attached, they are highly precise. The results can be effectively reflected in the design of a mobile computer. The attachment region is called a media bay (or device bay).

The shock measurement apparatus of the present invention has a size matching the form factor of a hard disk drive and is used for shock measurement during attachment to a media bay intended for receiving a hard disk drive. The shock measurement apparatus of the present invention, when attached to a notebook PC, allows a precise measurement of shock received by a hard disk drive.

As mentioned above, the form factor of a 2.5-inch hard disk drive installed in widely-used notebook PCs is 100.2±0.25 mm (l) 69.85±0.25 mm (w) 9.5±0.2 mm (h). Accordingly, the shock measurement apparatus of the present invention takes these dimensions. Any shock measurement apparatus having a size within this dimension range is assumed to match the form factor of a 2.5-inch hard disk drive. The physical size of the shock measurement apparatus is not required to be made to exactly match these values. Differences within the form factor specification are allowed. For the shock measurement apparatus of the present invention to allow for shock measurement with higher precision, it should have the same weight as the hard disk drive.

The present invention provides a shock measurement method using the shock measurement apparatus of the present invention for imitatively measuring shock received by a computer or other equipment having a hard disk drive to be detachably attached thereto, comprising the steps of: providing a shock measurement apparatus which comprises a shock measurement circuit including a sensor section for detecting shock and recording means and is used for the shock measurement in such a manner that the shock measurement apparatus is attached to a region intended to be used for the attachment of a hard disk drive unit; setting a parameter for the shock measurement in the shock measurement circuit while the shock measurement apparatus is connected to a controlling computer; attaching the shock measurement apparatus to the region intended to be used for the attachment of the unit with the shock measurement apparatus being disconnected from the controlling computer; and applying shock to said equipment while supplying electric power to the shock measurement apparatus from the equipment to record data on the shock on the recording means.

After the data is recorded, the measurement apparatus is removed from the equipment. Then the data on the shock recorded on the recording means is read into the controlling computer. The read data can be analyzed by the controlling computer.

The shock measurement method of the present invention is used with the shock measurement apparatus attached to the region intended for receiving the hard disk drive. Although the measurement is imitative, shock which would actually be received by the unit can be precisely represented. Because the shock measurement apparatus is supplied with electric power from the computer or other equipment, the shock measurement apparatus does not require a power supply battery. Accordingly, the size of the shock measurement apparatus can be reduced.

Once the parameters for shock measurement are set from the external controlling computer, the wiring connection with the controlling computer can be removed. The wiring does not hinder the application of shock.

DESCRIPTION OF THE PREFERRED EMBODIMENT

The present invention will be described with respect to an embodiment thereof.

The shock measurement apparatus 1 according to the embodiment is used for shock measurement for a notebook PC (hereinafter called a "notebook PC under measurement") 30. In particular, the shock measurement apparatus 1 is used for imitatively measuring shock received by a hard disk drive installed in the notebook PC under measurement 30. The hard disk drive includes dynamic mechanics such as a spindle motor for driving and rotating a magnetic disk and an actuator for driving a magnetic head. The dynamic mechanism is more susceptible to damage due to shock than the rest of the PC.

Figure 1:
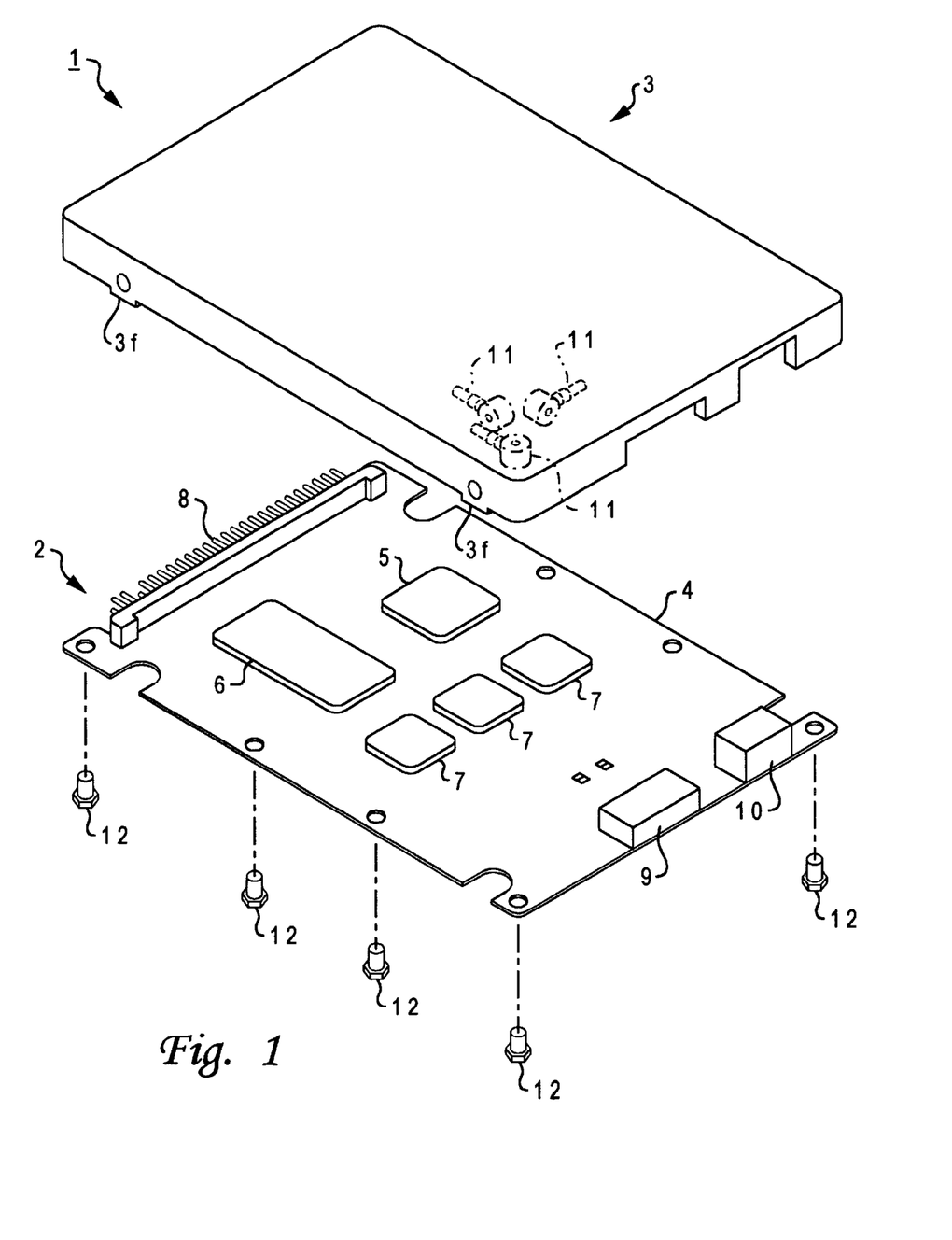
FIG. 1 is an exploded perspective view of a shock measurement apparatus according to the embodiment.
Figure 2:
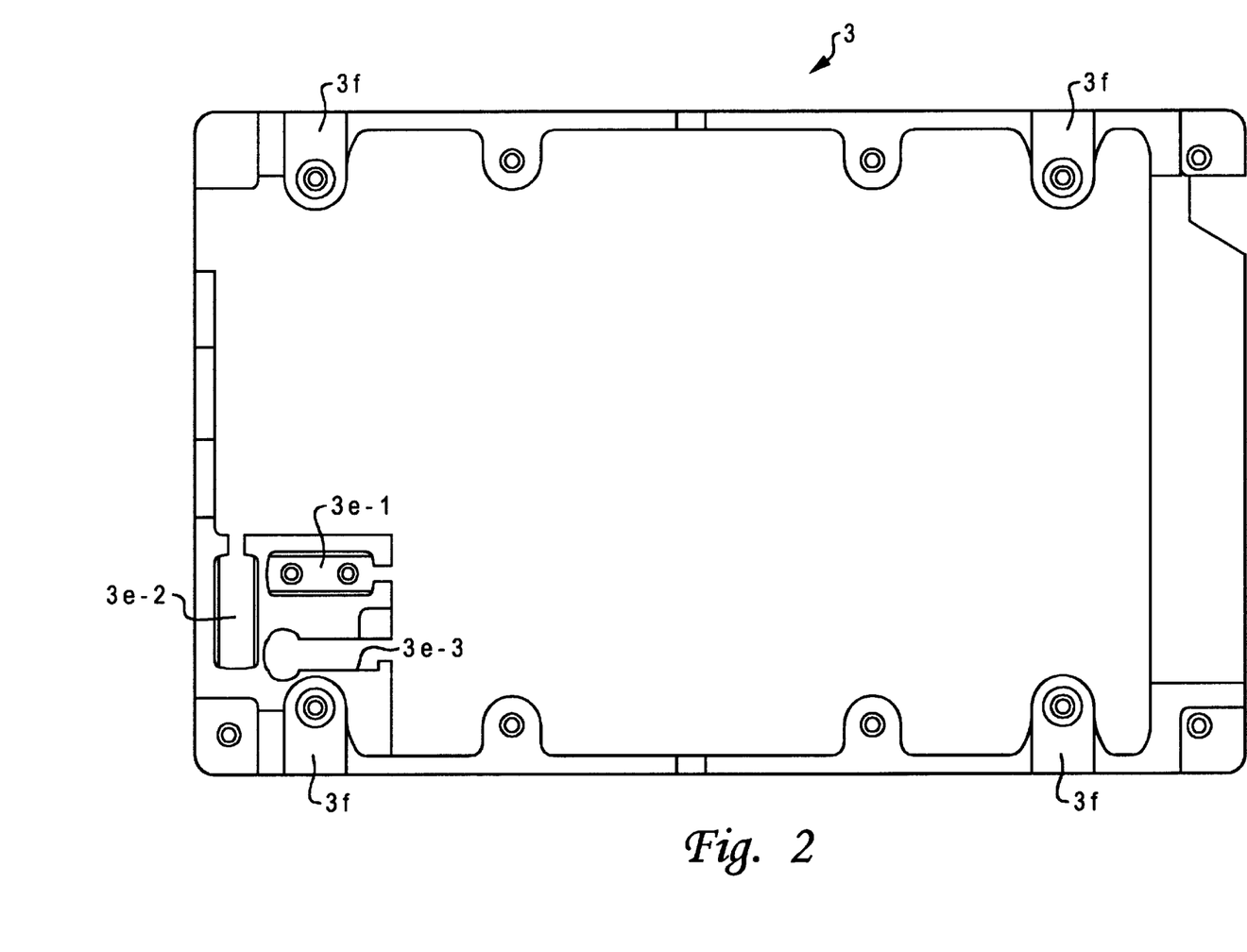
FIG. 2 is a plan view of the interior of the case of the shock measurement apparatus according to the embodiment.

FIG. 1 is an exploded perspective view of the shock measurement apparatus 1 according to the embodiment, and FIG. 2 is a plan view of the interior of a case 3 containing the shock measurement apparatus 1.

As shown in FIG. 1, the shock measurement apparatus 1 consists of a shock measurement circuit section 2 and the case 3.

The shock measurement circuit section 2 comprises a central processing unit (CPU) 5, flash memory 6, a charge amplifier 7, a hard disk drive compatible power supply connector 8, an interface connector 9, and an auxiliary power supply connector on the substrate 4.

The CPU 5 is responsible for operating the shock measurement circuit section 2 according to a predetermined program.

The flash memory 6 stores acceleration as a measured shock value. The flash memory 6 also stores parameters for the shock measurement. The parameters are input and set from a controlling personal computer (controlling PC) 20.

The charge amplifier 7 amplifies the acceleration data acquired by an acceleration pickup 11, which is a sensor for detecting shock. In this embodiment, three acceleration pickups 11 are provided: one for each of the X, Y, and Z directions. Three charge amplifiers 7 are provided.

The Hard disk drive-compatible power supply connector 8 is compatible with the power supply connector of the hard disk drive attached to the notebook PC under measurement 30. That is, the hard disk drive installed in the notebook PC under measurement 30 has a power connector (not shown) for receiving electric power from a power supply battery contained in the notebook PC under measurement 30. By connecting the power connector of the hard disk drive with the power supply connector provided for the notebook PC under measurement 30, electric power is supplied from the power supply battery contained in the notebook PC under measurement 30 to the hard disk drive. Because the hard disk drive-compatible power supply connector 8 is compatible with the power receiving connector of the hard disk drive, the shock measurement apparatus 1 can receive electric power from the power supply battery contained in the notebook PC under measurement 30 by connecting the Hard disk drive-compatible power supply connector 8 with the power supply connector of the notebook PC under measurement 30.

The interface connector 9 facilitates sending/receiving data to and from external equipment. In particular, the interface connector 9 allows input of parameters for shock measurement from the controlling PC 20 and output of data on acceleration recorded in the flash memory 6. The interface used is not limited to any specific type. Instead, any conventional interface such as RS232C and USB may be used.

The auxiliary power supply connector 10 is used for obtaining electric power when the shock measurement apparatus 1 is used separately. In some situations, the shock measurement apparatus 1 may be used for shock measurement separately. In such a situation, electric power is supplied to the shock measurement apparatus 1 through this auxiliary power supply connector 10.

The case 3 shown in FIGS. 1 and 2 has the external shape and dimensions that match those of the enclosure case of a hard disk drive (not shown). Feet 3f, having bolt holes, are provided in the four corners of the case 3. The feet 3f are used for bolting the shock measurement apparatus 1 to the notebook PC under measurement 30. Accordingly, the feet 3f have relatively high stiffness compared with the rest of the case and receive shock received by the notebook PC under measurement 30. Similar feet are provided in the enclosure case of the hard disk drive to bolt the hard disk drive to the notebook PC under measurement 30 through a bolt hole provided in the feet 3f.

Pickup receiving portions 3e-1 to 3e-3 are provided in the case 3 for receiving and fixing the acceleration pickups 11. Each of the acceleration pickups 11 is received by and fixed to each of the pickup receiving portions 3e-1 to 3e-3. The pickup receiving portion 3e-1 receives the acceleration pickup 11 for measuring acceleration along the X axis, the pickup receiving portion 3e-2 receives the acceleration pickup 11 for measuring acceleration along the Y axis, and the pickup receiving portion 3e-3 receives the acceleration pickup 11 for measuring acceleration along the Z axis. As can be seen from FIGS. 1 and 2, the pickup receiving portions 3e-1 to 3e-3 are provided in the vicinity of the feet 3f of the case 3. This is because the feet 3f have higher stiffness and receive more of the shock received by the notebook PC under measurement 30. The nearer to the feet the acceleration pickups 11 are positioned, the more precisely the shock can be measured.

In the shock measurement apparatus 1 consisting of the above-mentioned components, the shock measurement circuit section 2 and the case 3 are assembled by means of bolts 12. The enclosure of the assembled shock measurement apparatus 1 has dimensions that match the form factor of a 2.5-inch hard disk drive. That is, the dimensions are 100 mm (l), 70 mm (w), and 9.5 mm (h). The shock measurement apparatus is designed to have a weight substantially similar to that of the hard disk drive, within the range from 95 to 105 g. A 2.5-inch hard disk drive weighs about 100 g.

A method for measuring shock received by the notebook PC under measurement 30 using the shock measurement apparatus 1 will be described below with reference to FIGS. 3 to 5.

Figure 3:
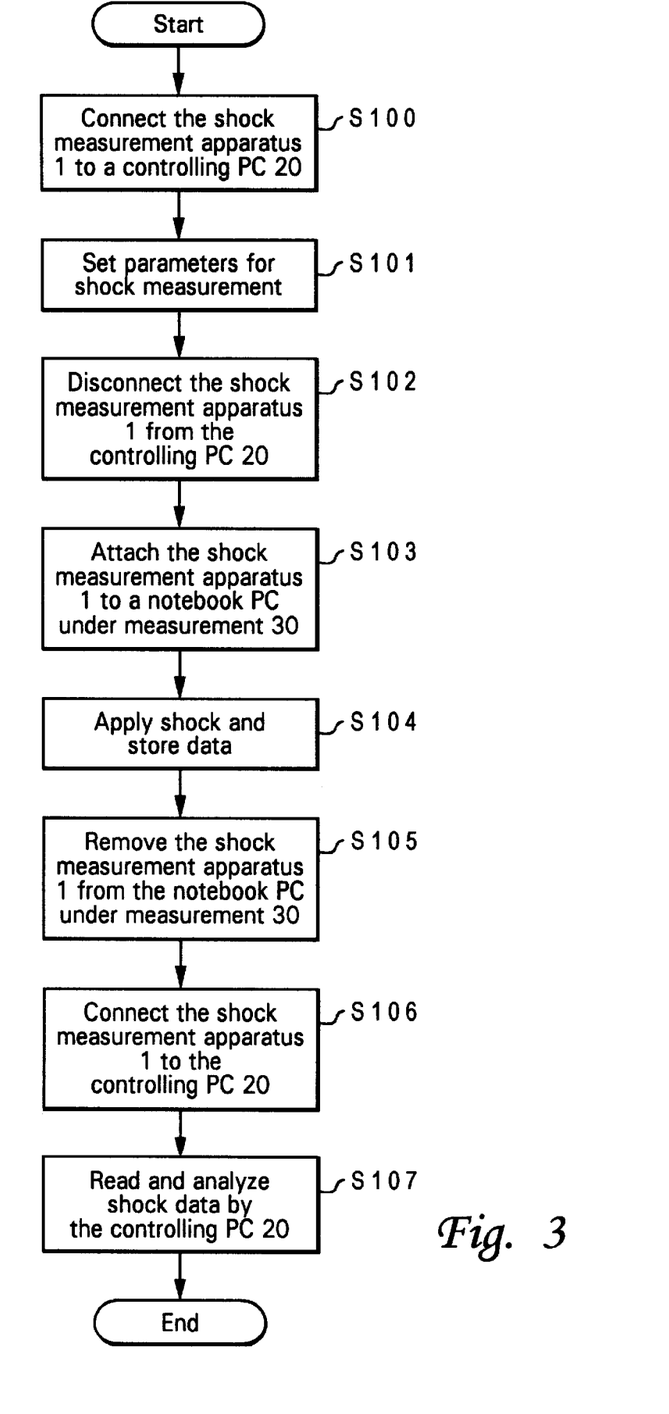
FIG. 3 is a flowchart for explaining a shock measurement method using the shock measurement apparatus according to the embodiment.
Figure 4:
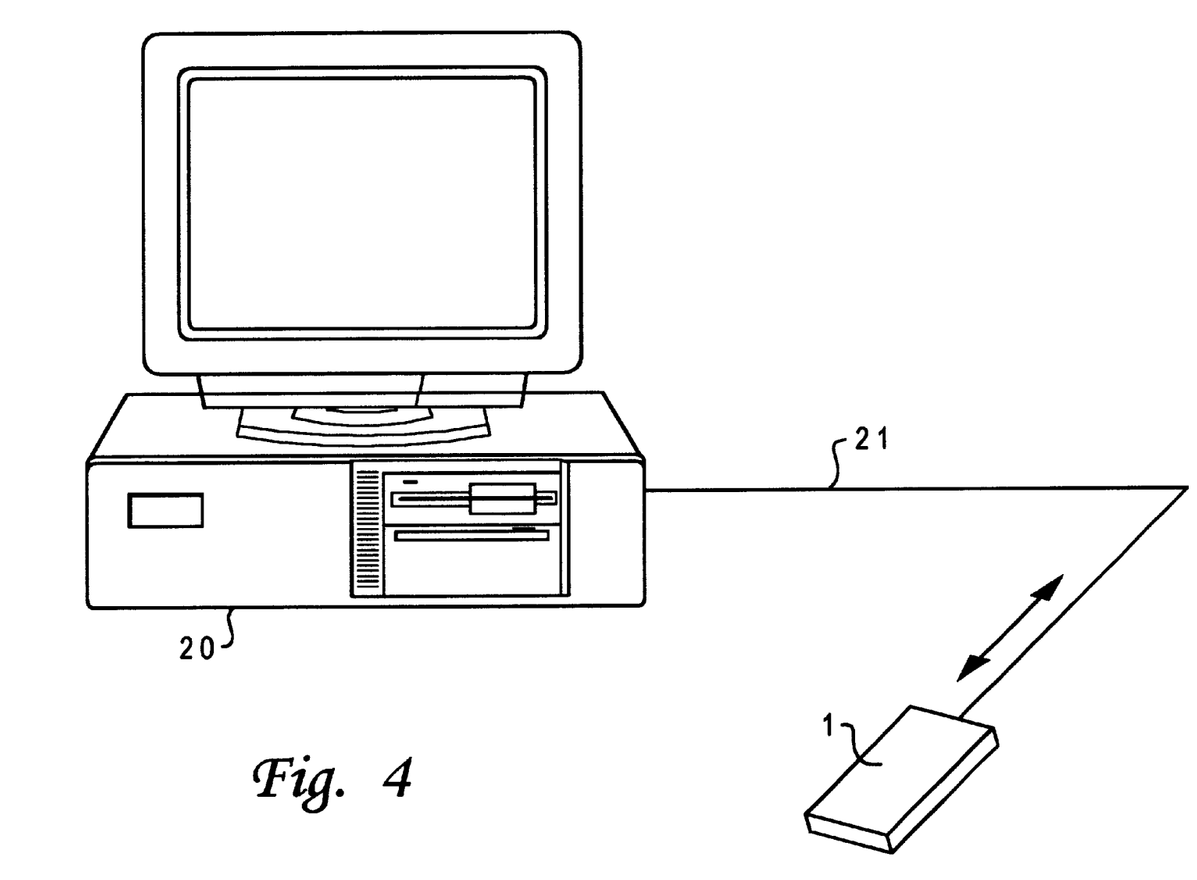
FIG. 4 shows the shock measurement apparatus connected to a controlling PC according to the embodiment.

First, the controlling PC 20 is connected to the shock measurement apparatus through an interface 21 (see S100 in FIG. 3, and FIG. 4). The interface 21 may be a conventional interface such as RS232C and USB.

Next, the parameters for shock measurement are input to and stored in the shock measurement apparatus 1 from the controlling PC 20 (S101 in FIG. 3). The parameters may be various parameters, including the maximum appliable acceleration (G), a trigger level (G), resolution, the precision of measurement, sampling time, and the number of events recorded. The trigger level is the minimum acceleration (G) to be recorded. The resolution may be switched between 0.1G and 1G, for example. The sampling time is the time interval at which received shock (acceleration) is to be recorded. The number of events recorded is the maximum number of events that can be recorded.

Once the parameters are set, the interface 21 is removed to disconnect the shock measurement apparatus 1 from the controlling PC 20 (S102 in FIG. 3). Once disconnected from the controlling PC 20, the shock measurement apparatus 1 automatically enters shock measurement mode.

Figure 5:
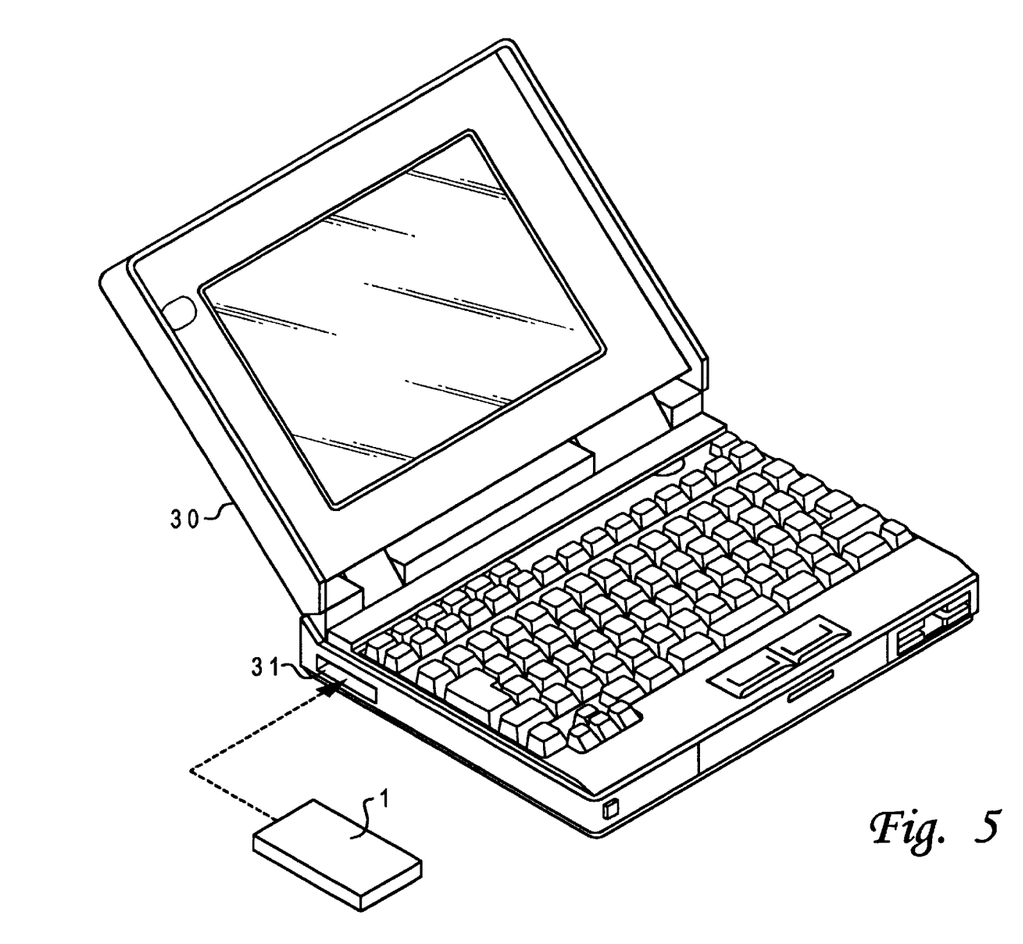
FIG. 5 is a drawing for explaining the attachment of the shock measurement apparatus to the media bay of a notebook PC under measurement.

The shock measurement apparatus 1 is then attached to the media bay 31 of the notebook PC under measurement 30 (see S103 in FIG. 3, and FIG. 5). At this time, the hard disk drive, which would otherwise be attached to the media bay 31, has been removed from the media bay 31 of the notebook PC under measurement 30. This creates space in the media bay 31. The attachment of the shock measurement apparatus 1 to the notebook PC under measurement 30 is completed by fixing the feet 3f of the shock measurement apparatus 1 to the notebook PC under measurement 30 by means of the bolts.

After the shock measurement apparatus 1 is attached to the notebook PC under measurement 30, shock is applied to the notebook PC under measurement 30 (S104 in FIG. 3). The shock may be applied instantaneously, or may be applied continuously for a predetermined period of time. Alternately, the notebook PC under measurement 30 may be actually carried and shock applied during transit may be measured. In any case, the shock to be applied may be chosen according to the purpose. While the shock is applied, acceleration (G) data on the shock is recorded in the flash memory 6 according to the above described parameters.

After the shock is applied and recorded, the shock measurement apparatus 1 is removed from the notebook PC under measurement (S105 in FIG. 3). The shock measurement apparatus 1 removed from the notebook PC under measurement 30 is then connected to the controlling PC through the interface 21 (see S106 in FIG. 3, and FIG. 4).

The recorded data on the shock is then read from the flash memory 6 of the shock measurement apparatus 1 by the controlling PC 20. The data is used for various kinds of analysis on the controlling PC 21. For example, the input waveform of the acceleration (G) may be displayed on the display of the controlling PC 20. The displayed acceleration includes acceleration along each of the X, Y, and Z axes. The axis along which shock is most strongly applied can be seen. Based on results of these measurements, the design of the notebook PC under measurement 30, and in particular the hard disk drive, can be changed to ensure that excessive acceleration is not applied to them.

As described above, the shock measurement apparatus 1 according to the embodiment has a size that matches the form factor of the hard disk drive of the notebook PC under measurement 30 and has a weight substantially similar to that of the hard disk drive. Therefore the shock that is measured is the same as shock that would be received by the notebook PC under measurement 30 with the hard disk drive attached.

While the embodiment described above includes an apparatus 1 for measurement of shock applied to the hard disk drive of a notebook PC, the present invention is not limited to this embodiment. The present invention may be widely applied to various types of equipment including other types of information processing systems and mobile devices. It is not limited to PCs. In particular, the present invention may be applied to any equipment to which a detachable unit is attached, such as the hard disk drive described with respect to the preferred embodiment. The present invention is especially effective in the case where the unit contains dynamic mechanics.

As described above, because the shock measurement apparatus of the present invention does not alter the physical characteristics of the equipment, (e.g. a notebook PC, that receives shock, the shock value can be accurately measured. In addition, the present invention allows the result of the measurement to be reflected in the design of the equipment, thereby contributing to improved shock resistance of the equipment.

What is claimed is:

1. A shock measurement apparatus for measuring shock received in an area normally occupied by a disk drive device in a computer, said shock measurement apparatus comprising:
    a sensor for detecting shock magnitude;
    power receiving connector for receiving electric power from said computer; and
    an enclosure containing said sensor and said power receiving connector and having the same size as the size of said disk drive device without containing a disk drive, wherein said shock measurement apparatus detects said shock magnitude but does not perform conventional functions of a disc drive device.

2. The shock measurement apparatus according to claim 1, wherein said power connector is compatible with a power supply connector for said disk drive device and can receive power from the computer.

3. The shock measurement apparatus according to claim 1, wherein said disk drive device is a hard disk drive and the form factor thereof is 2.5 inches or smaller.

4. The shock measurement apparatus according to claim 1, wherein said sensor is positioned in a place in said enclosure having a relatively high stiffness.

5. A shock measurement apparatus for measuring shock received by equipment having a unit which is attachable to said equipment and a power supply connector for supplying electric power to said unit, the shock measurement apparatus comprising:
    shock measurement circuit including a sensor for detecting shock magnitude; and
    a power receiving connector connected to the power supply connector of said equipment for receiving electric power for driving maid shock measurement circuit, wherein said shock measurement apparatus is used for a shack magnitude measurement by being attached to a region to which said unit is conventionally attached, and further wherein the shock measurement apparatus does not contain all means necessary to perform conventional functions of the unit.

6. The shock measurement apparatus according to claim 5, wherein said sensor unit further comprises multiple sensors, each of which detects shock along each of the X, Y, and Z axes.

7. The shock measurement apparatus according to claim 5, wherein said shock measurement circuit comprising a central processing unit responsible for the operation of said shock measurement circuit, memory for storing a measured shock value that describes said shock magnitude, and a charge amplifier which are mounted on a substrate.

8. The shock measurement apparatus according to claim 5, further comprising an interface for sending and receiving data to said shock measurement circuit.

9. The shock measurement apparatus according to claim 5, wherein said unit includes dynamic mechanics.

10. A shock measurement apparatus for imitatively measuring shock received by a mobile computer having a region for attachment of a hard disk drive, said shock measurement apparatus comprising:
    an enclosure having a size matching the form of said hard disk drive but not having means for performing conventional function of said hard disk drive;
    a shock magnitude measurement circuit which is placed in said enclosure and includes an acceleration pickup for detecting acceleration as shock; and
    a power receiving connector for receiving electric power from an internal power supply contained in said mobile computer.

11. The shock measurement apparatus according to claim 10, wherein said shock measurement apparatus is used for a measurement by being attached to a region where said hard disk drive is conventionally attached.

12. The shock measurement apparatus according to claim 10, wherein the weight of the shock measurement apparatus approximately matches that of said hard disk drive.

13. A shock measurement method for imitatively measuring shock received by equipment having a unit attachable thereto, said method comprising the steps of:
    positioning a shock measurement apparatus, which comprises a shock measurement circuit having a sensor section for detecting shock magnitude and a recorder, in a region conventionally used by a unit in an equipment;
    setting a parameter for a shock measurement in said shock measurement circuit while the shock measurement apparatus is connected to a controlling computer;
    attaching said shock measurement apparatus to said region intended to be used by said unit while said shock measurement apparatus is disconnected from said controlling computer; and applying shock to said equipment while supplying electric power to said shock measurement apparatus and recording data describing the shock magnitude on said recorder.

14. The shock measurement method according to claim 13, further comprising a step of, after said data is recorded, reading said data on said shock recorded on said recorder of said shock measurement apparatus into said controlling computer after said shock measurement apparatus is removed from said equipment.

* * * * *

UNITED STATES PATENT AND TRADEMARK OFFICE
CERTIFICATE OF CORRECTION

PATENT NO. : 6,593,855 B1
DATED : July 15, 2003
INVENTOR(S) : Fujino et al.

It is certified that error appears in the above-identified patent and that said Letters Patent is hereby corrected as shown below:

Column 9,
Line 49, delete "power" and insert -- a power --.

Column 10,
Line 6, delete "shock" and insert -- a shock --.
Line 10, delete "maid" and insert -- said --.
Line 12, delete "shack" and insert -- shock --.

Signed and Sealed this

Twenty-third Day of December, 2003

JAMES E. ROGAN
*Director of the United States Patent and Trademark Office*